US012090747B1

(12) United States Patent
Dameron

(10) Patent No.: US 12,090,747 B1
(45) Date of Patent: Sep. 17, 2024

(54) LETTERPRESS GAGE PIN AND METHOD OF PLACEMENT

(71) Applicant: Jayson Dameron, Monroe, NY (US)

(72) Inventor: Jayson Dameron, Monroe, NY (US)

( * ) Notice: Subject to any disclaimer, the term of this patent is extended or adjusted under 35 U.S.C. 154(b) by 0 days.

(21) Appl. No.: 18/208,611

(22) Filed: Jun. 12, 2023

(51) Int. Cl.
*B41F 1/34* (2006.01)

(52) U.S. Cl.
CPC .................................... *B41F 1/34* (2013.01)

(58) Field of Classification Search
USPC ........................................ 101/413, 414, 415
See application file for complete search history.

(56) References Cited

U.S. PATENT DOCUMENTS

| | | | | |
|---|---|---|---|---|
| 122,842 A * | 1/1872 | Maxwell | B41F 1/28 12/39 |
| 408,122 A * | 7/1889 | Megill | B41F 1/28 101/415 |
| 1,119,293 A * | 12/1914 | Liebs | B41F 1/28 101/413 |
| 1,370,827 A | 3/1921 | Megill | |
| 1,400,303 A | 12/1921 | Megill | |
| 1,408,756 A | 3/1922 | Megill | |
| 1,416,488 A | 5/1922 | Megill | |
| 1,455,346 A | 5/1923 | Megill | |
| 2,199,288 A | 4/1938 | Hoover | |
| 2,270,145 A | 1/1942 | Sparks | |
| 2,299,289 A | 10/1942 | Winders | |
| 2,802,558 A * | 8/1957 | Wexler | B41J 15/10 446/143 |
| 2,827,706 A * | 3/1958 | Fuller | G01B 5/0002 33/DIG. 1 |
| 3,052,184 A * | 9/1962 | Closz | B41F 1/26 101/415 |
| 2018/0022134 A1* | 1/2018 | Myska | B41K 1/00 101/109 |

* cited by examiner

*Primary Examiner* — Leslie J Evanisko
(74) *Attorney, Agent, or Firm* — Baldini Law, LLC

(57) ABSTRACT

A gage pin and placement device (jig) and method for use with hand fed letterpress to ensure uniform placement of print paper with speed and efficiency.

9 Claims, 8 Drawing Sheets

LETTERPRESS GAGE PIN AND METHOD OF PLACEMENT

FIELD OF THE INVENTION

A gage pin and placement device (jig) and method for use with hand fed letterpress to ensure uniform placement of print paper with speed and efficiency.

BACKGROUND

There have been very few innovations relating to hand fed letterpress printing devices and techniques in the last hundred years. From the inception of the Gutenberg moveable type printing press, the publishing world has seen all sorts of advancements through desktop publishing and computer printing techniques. Still, though, there is a desire for true letterpress printing as it is seen as more artistic, genuine, and classy.

One particular type of letterpress printing utilizes Gordon style printing presses such as the Chandler & Price platen press. Essentially, there is a base, onto which is affixed a plate that contains the letters and/or artwork which will be inked and pressed onto paper. The paper onto which the base and plate will be pressed has to be aligned properly to print. The printing paper is laid onto tympan paper and to align it properly, gage pins are utilized. Traditionally, gage pins are one of a very few types.

There is the MeGill gage pin which are stabbed into the tympan paper and then taped or waxed into place. It is tedious and not entirely accurate and there still can be movement which, if happens, means each printed piece is not uniform. An advancement is a Kort lay gage pin, which self-clamp after having to first provide cuts in the tympan paper to properly align. Again, it is tedious, not completely without any movement, even where wax or tape is utilized. Both of these also cut into the tympan paper meaning the tympan paper gets mutilated over time.

As background, advancement in this industry include, U.S. Pat. No. 1,370,827, titled FEED-GAGE FOR USE ON PRINTING PRESSES, discloses, "feed gages for use on printing presses, and which are secured to the tympan sheets on the platen of the press to serve as stops or rests, locating the position of the sheets to be printed." Related patents include U.S. Pat. Nos. 1,400,303, 1,408,756, 1,416,488, 1,455,346, 2,199,288, and 2,299,289. All of these require cutting or stabbing into the tympan paper and are tedious to use and imperfect in remaining stationary.

In another example of a more recent development, U.S. Pat. No. 3,976,006, titled PRINTING PRESS REGISTER GUIDES, discloses, "a snap-on drop away register guide for use with a Heidelberg platen in a Heidelberg printing press includes a reciprocating spring biased plunger having transversely mounted thereon, for oscillating movement, a retractable guide plate. A camming arrangement exists between the guide plate and plunger which is operable upon rectilinear movement of the latter to effectuate the oscillating movement of the former between extended and retracted positions." Not only is this device limited to one specific manufacturer of press, it requires some affixation to the press itself becoming part of the machine.

Finally, in U.S. Pat. No. 4,959,910, titled, PRINTING PRESS, disclosed is, "a printing press is provided having an improved register cam incorporated therein, the printing press also including a transverse alignment mechanism for aligning the printing medium prior to printing thereon."

There typically needs to be three placed gage pins in any single use setup. Two are used to set the horizontal line of the back edge of the paper to be printed and then one along the vertical edge to set the side line. All three need to be set outside the footprint area of the base that will ultimately stamp the paper, or else the pin could damage the base (or vice-versa) if the base presses into the gage pin when cycling through to stamp the paper. To alleviate this, there is also a Henry's compressible gage pin, which is essentially a piece of foam with a sticky surface such that you can just stick it into place and if it were to hit the base, the gage pin itself would compress and not damage the base. There are drawbacks to this arrangement as well. Paper does not slide easily along the edge of the foam to set the to be printed paper in place and the stick-on mechanism to adhere the gage pin does not easily allow for adjustment if needed, and once the 'sticky' has been used for awhile, it loses its adhesiveness and is subject to movement. There remains a shortcoming in the hand fed letterpress art for a paper gage pin to set in place easily, efficiently, and without any appreciable movement during use.

Disclosed herein is a set of three gage pin paper guides that adhere to the platen on top of the tympan paper utilizing magnets (the undersurface base (platen) is steel and magnetic) and a friction paper (like sandpaper) against the tympan paper, which sets them in place fairly rigidly for use and yet allows for slight adjustments if necessary, fairly easily. More importantly, they are devised to be set into place without any need for measuring, or cutting, or stabbing, of any kind, by being set into place by the bed of the press itself. Each gage pin is initially housed in a specially designed jig that itself is placed on the bed of the press adjacent to the base and attached also utilizing magnets. Then, when the press is cycled once with the jigs attached and gage pins housed, the gage pins then adhere themselves to the tympan undersurface at exactly the perfect spot, always outside the surface area of the base or form, so never any chance of smashing into the base during actual printing. This setup is more specifically described throughout this paper.

None of the foregoing references or any other known prior art references, alone or in combination, teach the salient and proprietary features or construction of the present disclosure, and as such, fail to be as useful as a letterpress gage pin and placement device as described.

The present disclosure teaches an embodiment of a hand fed letterpress gage pin and jig housing to both set the gage pin in place and then use the gage pin in letterpress printing that provide a proprietary gage pin-jig housing combination that reduces time and costs for using a hand fed letterpress machine and encouraging continued resurgence of the art form. Moreover, the embodiments described herein do not mutilate the tympan paper, either.

SUMMARY

The present disclosure teaches embodiments of a hand fed letterpress gage pin that are made from plastic or some other hard, easily manufactured, and easy for paper to slide against, material, embedded with magnets allowing the gage pin to adhere in place to the letterpress tympan paper undersurface, and comprising a friction, sandpaper like surface that resists any movement against the tympan paper once set in place. Embodiments described herein also include a jig, also made from plastic or some other durable and easy to manufacture material, also embedded with magnets to adhere to the letterpress bed adjacent to the base or form, and configured to comprise a cavity specifically designed to temporarily house the gage pin a specific distance away from the side of the base or form, until the letterpress is cycled one turn whereupon, when the gage pins come within reach of the tympan paper, the embedded magnets and the letterpress platen attract each other with enough force to set the gage pins in place on the tympan paper and remove them from their corresponding jig housings. Then, the jigs can be removed, the to be printed paper aligned by the now set in place gage pins, and printing started-all with no measuring or cutting into the tympan paper, and with gage pins more securely and accurately in place than ever before. If a slight adjustment is needed, it is easy to lift and re-position for very slight, minor, (or major) adjustments.

In one embodiment, there are four round, 3⁄16" diameter× 1⁄8" high, neodymium magnets embedded into the gage pins in a substantially square configuration.

In one embodiment, there are two round, 3⁄16" diameter× 1⁄8" high, neodymium magnets embedded into the jigs, one on each end of the jig so that no matter which side is aligned against the letterpress base, there will be sufficient adhesion to the bed of the press.

In one embodiment, the jigs have a cavity of negative space configured to mimic the positive space taken up and comprising the gage pins for the gage pins to sit into to be deployed.

In one embodiment, the sides of the jigs are of different widths to allow the user to decide how far outside the printing area of the base the gage pins are to be deployed.

In one embodiment, the device described herein comprises, a jig-gage pin combination device comprising a jig further comprising an at least one embedded magnet and a negative cavity space configured to be substantially the size and shape of the gage pin with which it is to be utilized; and a gage pin further comprising an at least one embedded magnet, a bottom smooth surface and a top surface smaller in footprint than the bottom surface having a predefined width between said top and bottom surfaces and said predefined width comprising smooth side walls and said top surface further comprising a friction material.

In one embodiment, the jig contains two embedded magnets, one substantially at each end.

In one embodiment, the jig comprises ends of differing widths as measured from each said end to the beginning of the negative space cavity (8) configured to contain the gage pin (See FIG. 9 showing 3 mm and 6 mm ends).

In one embodiment, the gage pin contains four embedded magnets.

In one embodiment, the gage pin top surface further comprises indentations (5) on each end.

In one embodiment, the width between the top smooth surface of the gage pin and the smaller footprint bottom surface comprising a friction material on its surface will have smooth side walls against which paper easily slides.

DETAILED DESCRIPTION

For clarity of disclosure, and not by way of limitation, the detailed description of the invention is divided into the following subsections that describe or illustrate certain features, embodiments or applications of the present invention.

Definitions

“gage pin” as used herein means any device commonly used in the letterpress industry to be set in place on the tympan paper utilized to guide the to be printed paper into proper alignment for printing.

“jig” as used herein means a device utilized to temporarily house a gage pin and configured to guide and place a gage pin into the proper place on the tympan paper.

“hand fed letterpress” as used herein means a printing press with a platen and a base onto which is affixed a plate that contains relief letters or artwork to be inked and pressed onto singularly hand fed paper to be printed.

“friction paper” as used herein means any material that on one side is embedded a heightened friction producing substance that inhibits movement of the material along a surface in which it is contact. Common sandpaper is a non-limiting example of such a material.

The System and Method of the Present Invention

One embodiment of the proprietary device and method described herein utilizes a jig, embedded with a magnet on either end and configured to contain a negative space cavity in the same general shape and size of a positive space gage pin, wherein the gage pin fits neatly into the cavity space configured to contain it and further is embedded with magnets as well and has a piece of friction paper on its outer surface that will ultimately contact the tympan paper.

In one embodiment, the jigs have a different widths from the end of the jig to the beginning of the gage pin in order to offer the user different spaces that the gage pin would be placed outside the base printing footprint. In a preferred embodiment, one end of the jig would offer a three millimeter space and the other end would offer a six millimeter end. See FIG. 9. Thus, when the 3 mm end is placed against the base, the gage pin would be set in place on the tympan paper, 3 mm outside the base printing footprint and if the 6 mm end were to placed against the base, the gage pin would be set in place 6 mm outside the base printing area footprint. In actuality, any desired dimension could be utilized, but these are currently seen as the most typically desired dimensions in practice.

Figure 1:
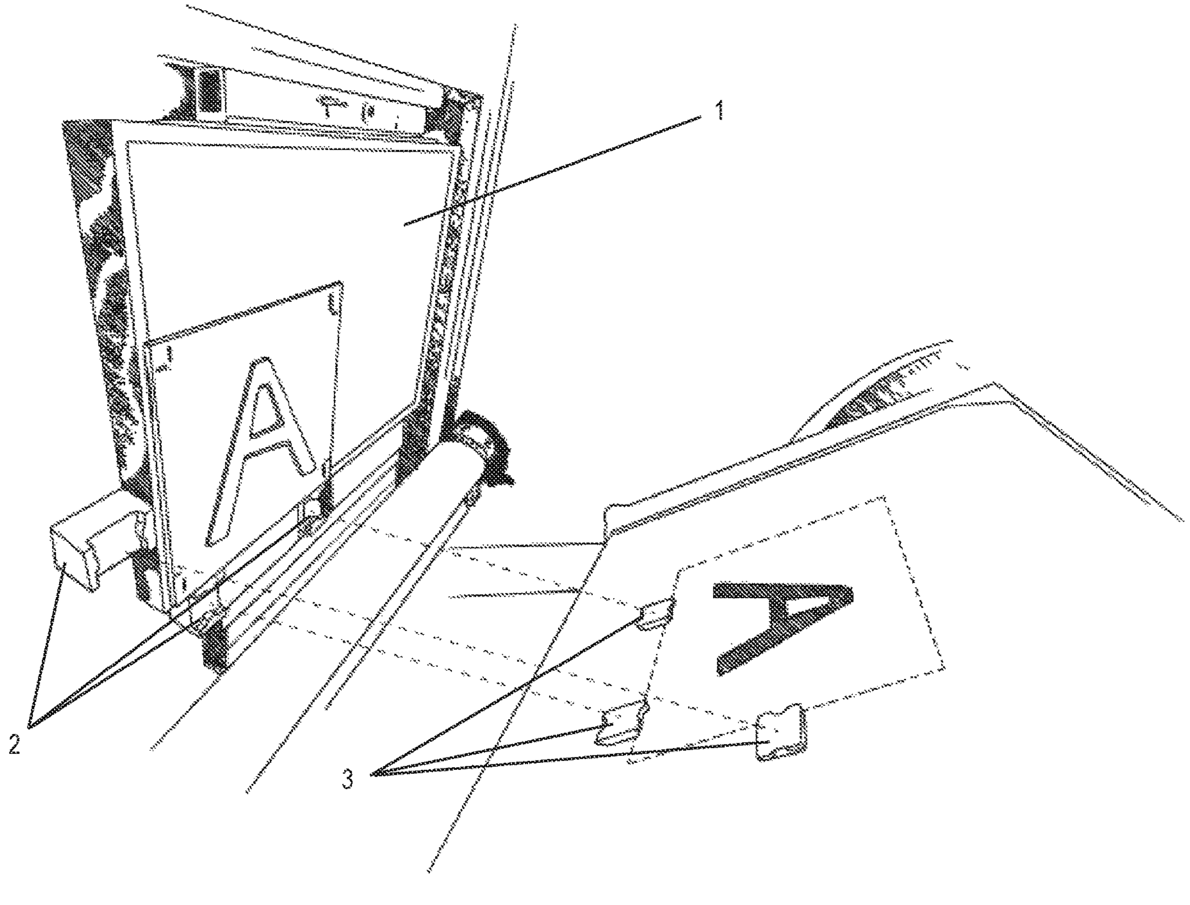
FIG. 1 depicts one embodiment of a typical existing letterpress machine but now utilizing an embodiment of the jig-gage pin combination described throughout this paper.
Figure 6:
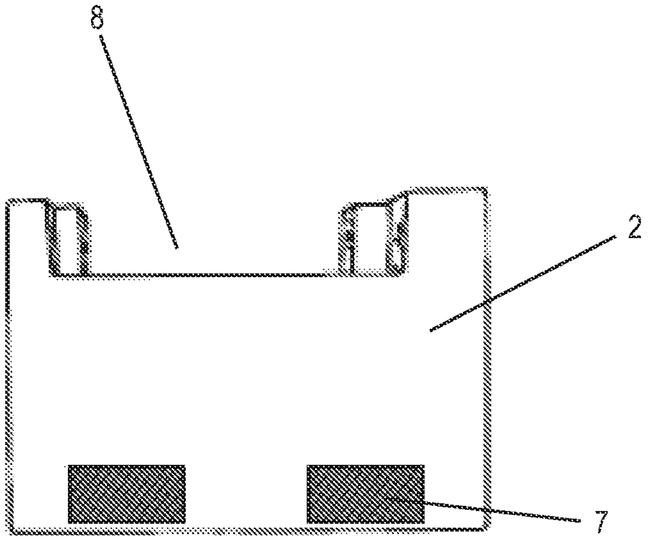
FIG. 6 depicts one embodiment of a side view of a jig, with a negative cavity space at the top into which a properly configured gage pin would fit, and two magnets, one at each end, embedded into the jig (would not actually be seen once embedded, but shown here to show placement).
Figure 7:
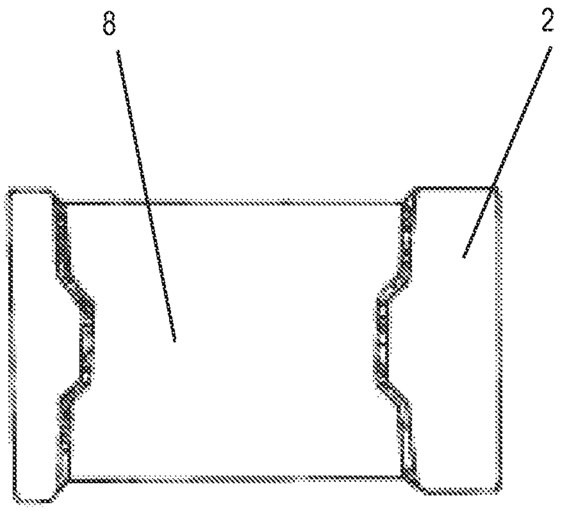
FIG. 7 depicts one embodiment of a top view of a jig, with a negative cavity space at the top into which a properly configured gage pin would fit, showing the indentations to guide the gage pin properly into place.

In one embodiment, a jig (2) is configured to have embedded in each end, one 3⁄16" diameter by 1⁄8" tall neodymium magnets (7) that offer approximately 20 lb pull force and is approximately just taller than the base of a letterpress with which it is to be used and contains a negative space cavity (8) configured to be the size and shape of a gage pin (3). See FIG. 6. One end of the jig (2) is approximately 3 mm from its end to the beginning of the gage pin space (8) whereas, the other end is approximately 6 mm. The embedded magnets should be sufficient to affix the jigs to the bed of the press adjacent to the side of the base (as shown in FIG. 1). Which end is chosen to be affixed to the side of the base will determine how far outside the base printing footprint area the gage pins will be set in place.

Figure 2A:
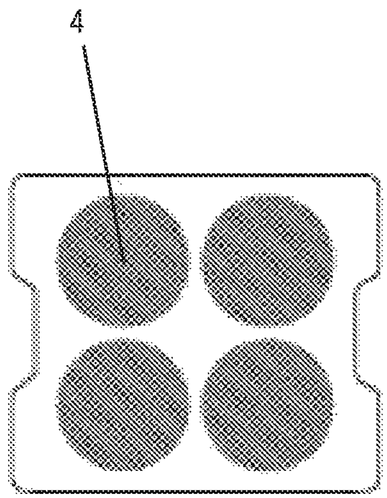
FIG. 2A depicts one embodiment of a gage pin showing an embedded alignment of magnets of the bottom surface (the side away from the tympan paper).
Figure 2B:
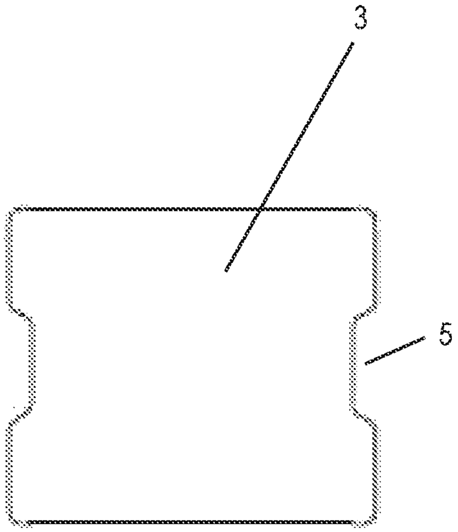
FIG. 2B shows the same embodiment of a gage pin how it would actually be seen by a user, the magnets not showing because they are embedded inside.
Figure 3A:
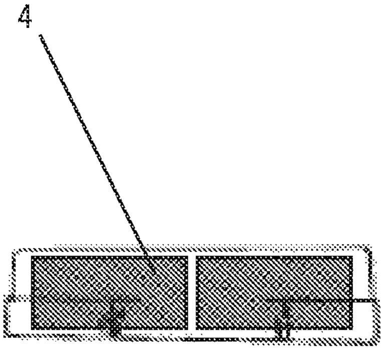
FIG. 3A depicts one embodiment of an end side view of a gage pin showing the embedded magnets and the space in the ends of the gage pin to align it into a jig.
Figure 3B:
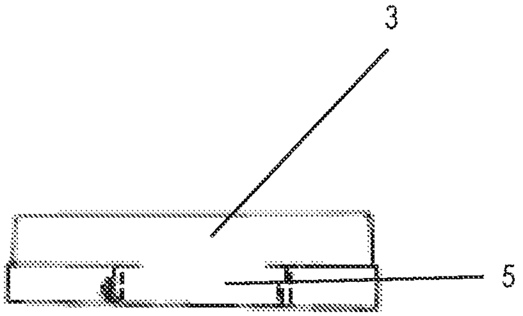
FIG. 3B shows the same embodiment of a gage pin how it would actually be seen by a user, the magnets not showing because they are embedded inside.
Figure 4A:
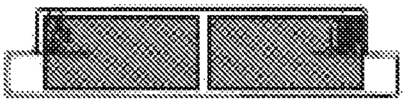
FIG. 4A depicts one embodiment of a side view of a gage pin showing the embedded magnets and since this is the side, there is no space in the sides of the gage pin to align it into a jig.
Figure 4B:
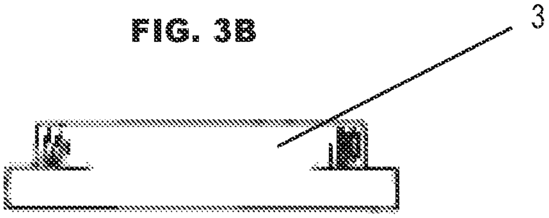
FIG. 4B shows the same embodiment of a gage pin how it would actually be seen by a user, the magnets not showing because they are embedded inside.
Figure 5A:
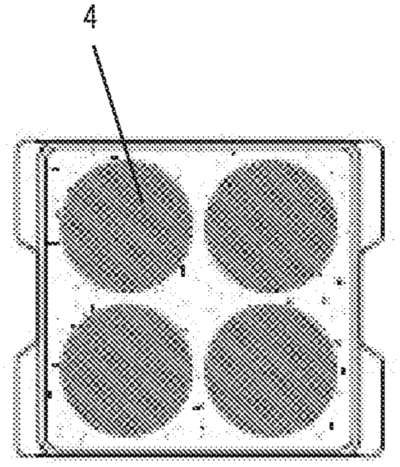
FIG. 5A depicts one embodiment of a gage pin showing an embedded alignment of magnets of the top surface (the side towards from the tympan paper), and the friction paper that would actually touch the surface of the tympan paper.
Figure 5B:
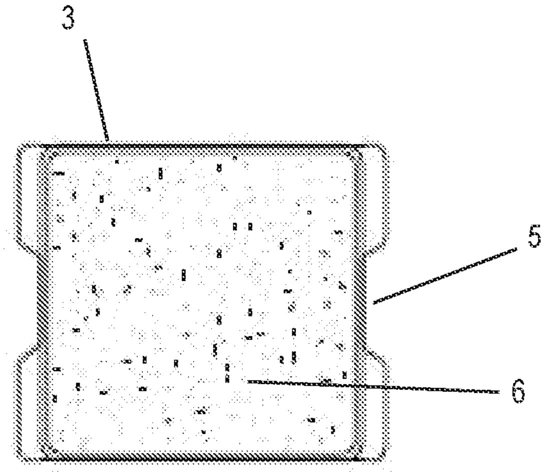
FIG. 5B shows the same embodiment of a gage pin how it would actually be seen by a user, the magnets not showing because they are embedded inside, the entire top surface covered by the friction paper and the ends having the indentations and the sides being completely straight, to meet the configuration of the cavity negative space of the jigs.

In one embodiment, a gage pin (3) is configured to have a flat surface side (see FIG. 2B) and a top surface side configured with a friction paper surface (6) (see FIG. 5B). The overall shape of the outer perimeter is as shown in FIG. 5B. Embedded into the gage pin are four 3⁄16" diameter by 1⁄8" tall neodymium magnets (4) as shown in FIG. 5A. FIG. 5A shows the placement of the magnets, but in reality, they are not seen by a user (unless the gage pins were made of a clear substance such as an acrylic) as it is seen as a more elegant solution to embed the magnets than simply affixed on the surface. In any event, they would be covered over by the friction paper that is utilized.

Figure 8:
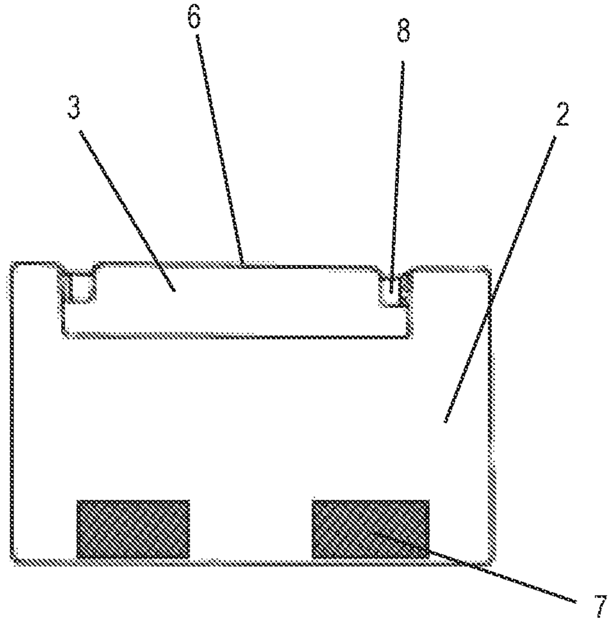
FIG. 8 depicts one embodiment of a jig-gage pin combination from a side view showing a gage pin fit into the negative cavity space of the jig, and the two magnets, one at each end embedded into the jig (would not actually be seen once embedded, but shown here to show placement).
Figure 9:
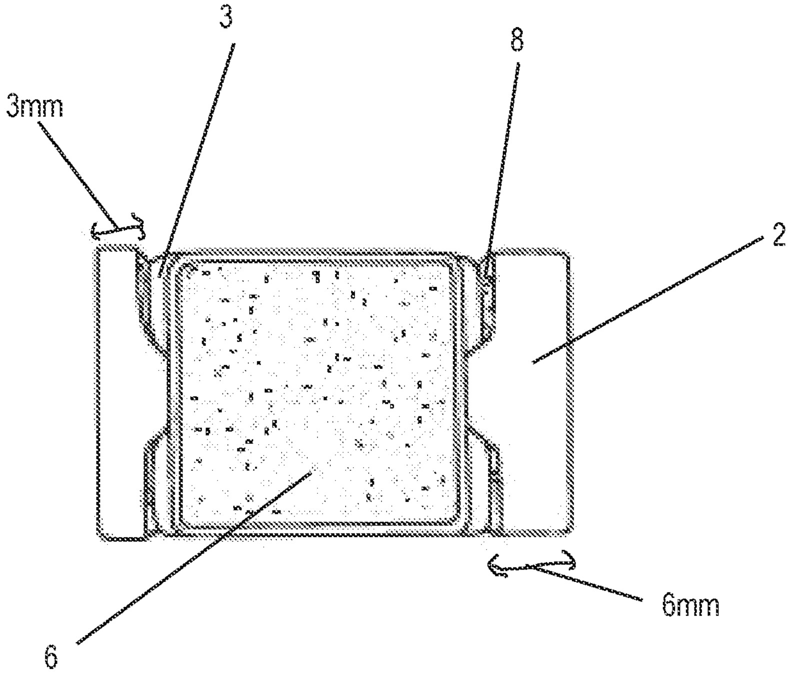
FIG. 9 depicts one embodiment of a jig-gage pin combination from a top view showing a gage pin fit into the negative cavity space of the jig showing the top part of the gage pin (the side that will ultimately rest against the tympan paper) having the friction paper.

In one embodiment, according to FIG. 8, the gage pin is placed into the jig with the flat surface down towards the jig and the friction paper surface exposed. Seen from the top, this is shown in FIG. 9.

In one embodiment, the user determines which end of the prepared jig/gage pin device to affix to the bed of the press adjacent to the side of the base (determined by the preferred distance outside the base printing footprint area the gage pins are desired to be set (3 mm or 6 mm) and sets three such devices in place as shown in FIG. 1. The user then cycles the letterpress for one cycle (prior to any ink having been applied). When the bed of the press along with the base meets the platen and tympan paper, the magnets in the gage pin provide a pull force to the metal undersurface (platen) underneath the tympan paper and the gage pins pull out of their nesting cavity in the jig and are set in place onto the tympan paper at the precise location as chosen-3 mm or 6 mm outside the base footprint printing area and in perfect alignment. The friction paper provides additional force to be overcome for the gage pins to slide out of position and thus the gage pins stay in perfect alignment throughout use. There is sufficient friction between the gage pin and the jig because of the configuration of the fit of the gage pin in the cavity configured to contain it that the gage pin does not simply fall out of the cavity. However, the fit is not too tight such that the force of the magnets easily pull it out and affix it to the tympan paper once near enough to metal platen undersurface. Once in place, the sides of the gage pin are a smooth plastic (or other desired material) surface along which paper slides easily to be guided into place for printing. The base lettering or artwork is then inked, a paper to be printed guided into place and the letterpress is cycled, the base hitting the paper, the gage pins neatly outside the base printing footprint area and never hitting the base, and the paper printed as desired. A next cycle is repeated, the gage pins staying firmly in place. The foregoing requires no measuring, no cutting, no stabbing, and the tympan paper remains more reusable than ever before and the gage pins stay in place better than ever before.

In embodiments, the jig could be manufactured from any suitable plastic, acrylic, or other desirable substance that is easy to manufacture, is non-magnetic, strong, durable and lightweight. Similar properties would be desired for the gage pin, as well, with the additional property that the side of the gage pin should be smooth and allow paper to be printed to easily glide along its outer surface.

Dimensions provided herein are currently the best known for the device as described, but other users of a letterpress may have a desire for different widths for the ends of the jig, for example, or it may be desirable to use an alternate configuration of magnets. These additional configurations are thought to be included in the overall spirit of this design with the essential components being a jig, affixed to the side of a base with magnetic force, housing a desired gage pin temporarily and the gage pin then being affixed to the tympan paper undersurface (platen) through magnetic force and inhibited from further movement through the use of a friction material. It should be mentioned that the jigs are configured to be the height of the base and not 'type-high' ('type-high' being the height from the base to surface of the character that takes ink, i.e., a modern letterpress base is 0.850, plus the adhesive to hold the plate to the base is 0.010 and the plate itself is 0.068, totaling 0.918)—in this configuration, the jig would be 0.850, not 0.918 type-high, so that the jig does not get inked.

The device designed and described herein is designed in conjunction with using and applicable to a Gordon style platen press such as the Chandler & Price platen press (1). However, the concepts and ideas described and utilized could be modified and adapted to any type of hand fed letterpress that uses a base and a platen that have magnetic properties and require the use of gage pins and this disclosure is thought to be applicable to any such configuration. By way of example and not limitation, there is still in use hand set type and assembled into a form rather than the described plate adhered to a base. In this configuration, the form gets locked up into the chase which locks onto the bed of the press just like the base does. The jigs would be set onto the bed adjacent to the form in that case, but the jig-gage combination as described would be identical.

Finally, it should be mentioned that tympan paper is traditionally used as the material that covers the platen and used to apply gages for registration as well as add or remove sheets to act as packing (like adjusting the firmness of the bed), which allows for an increase or decrease in the amount of impression. Modern materials have begun to replace traditional tympan paper, such as for example, synthetic sheets or fiberglass board. Nothing would change in the jig-gage combination as the bedding material is irrelevant. At most, if the synthetic material inhibited magnetism in some way, perhaps a stronger magnet would be needed, but the spirit and arrangement of the description herein would be the same.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A jig-gage pin combination device comprising:

a jig and a gage pin, said jig further comprising an at least one embedded magnet and a negative cavity space configured to be substantially the size and shape of the gage pin with which said jig is to be utilized; and said gage pin further comprising an at least one embedded magnet, a bottom smooth surface and a top surface smaller in footprint than the bottom surface having a predefined width between said top and bottom surfaces and said predefined width comprising smooth side walls and said top surface further comprising a friction material.

2. The device of claim 1, wherein the jig contains two embedded magnets, one substantially on each of two opposite ends of said jig, said jig being substantially rectangular in shape and said two opposite ends being the two sides of shorter length.

3. The device of claim 1, wherein the negative space cavity of the jig is configured to be off-center within a defined planar substantially rectangular shape such that the gage pin with which the jig is to be utilized, when inserted into said negative space cavity of the jig, is closer to one of two opposite ends than the other opposite end by a defined amount as measured from the respective end of the corresponding end of the gage pin to the corresponding end of the jig.

4. The device of claim 1, wherein the at least one embedded magnet of the gage pin is four embedded magnets.

5. The device of claim 1 wherein the gage pin top surface further comprises indentations on each of two opposite ends of said gage pin top surface, said gage pin top surface being substantially rectangular in shape and said two opposite ends being the two sides of shorter distance.

6. A gage pin comprising an at least one embedded magnet, a bottom smooth surface and a top surface smaller in footprint than the bottom surface having a predefined width between said top and bottom surfaces and said predefined width comprising smooth side walls and said top surface further comprising a friction material, said gage pin further characterized by the bottom surface being substantially rectangular in shape but having one indentation on each of its two opposite ends, said two opposite ends being the two sides of shorter distance.

7. The gage pin of claim 6, wherein the at least one embedded magnet is four embedded magnets.

8. The gage pin of claim 6, wherein the gage pin top surface further comprises indentations on each of two opposite ends of said gage pin top surface, said gage pin top surface being substantially rectangular in shape and said two opposite ends being the two sides of shorter distance.

9. A method of placement of gage pins on a platen of a letterpress machine comprising utilizing an at least one gage pin comprising an at least one embedded magnet, a bottom smooth surface and a top surface smaller in footprint than the bottom surface having a predefined width between said top and bottom surfaces and said predefined width comprising smooth side walls and said top surface further comprising a friction material, placing each of said at least one gage pin into a jig housing, said jig housing comprising an at least one embedded magnet and a negative cavity space configured to be substantially the size and shape of the gage pin with which said jig is to be utilized, attaching via the at least one embedded magnet of said at least one gage pin, said at least one jig-gage pin combination adjacent to a base of said letterpress machine on said base in a chosen orientation, and then cycling the letterpress machine one turn to set the at Least one gage pin via magnetic force to the platen.

* * * * *